United States Patent [19]

Wolff

[11] Patent Number: 4,485,843
[45] Date of Patent: Dec. 4, 1984

[54] VARIABLE PRESSURE RELIEF AND CONTROL VALVE

[76] Inventor: Robert C. Wolff, 955 Crystal, New Orleans, La. 70124

[21] Appl. No.: 442,294

[22] Filed: Nov. 17, 1982

Related U.S. Application Data

[63] Continuation-in-part of Ser. No. 260,849, May 5, 1981, abandoned, which is a continuation-in-part of Ser. No. 244,703, Mar. 17, 1981, abandoned, which is a continuation-in-part of Ser. No. 145,478, May 1, 1980, abandoned.

[51] Int. Cl.³ ............................................. F16K 15/02
[52] U.S. Cl. ..................................... 137/514; 137/529; 137/536; 251/64; 251/297
[58] Field of Search ............... 137/467, 529, 536, 514; 251/64, 297

[56] References Cited

U.S. PATENT DOCUMENTS

| | | | |
|---|---|---|---|
| 247,767 | 10/1881 | Krotsch | 137/557 X |
| 731,218 | 6/1903 | Perkins | 137/529 |
| 965,052 | 7/1910 | Wainwright | 137/536 X |
| 1,472,985 | 11/1923 | Lorimer | 137/536 X |
| 1,519,856 | 12/1924 | Lorraine | 137/529 |
| 1,558,925 | 10/1925 | Rogers | 251/214 X |
| 1,753,024 | 4/1930 | Rode | 137/529 |
| 2,178,901 | 11/1939 | Webster | 73/4 R |
| 2,306,029 | 12/1942 | Salzer | 137/529 |
| 2,745,627 | 5/1956 | Winfree | 251/297 X |
| 2,820,474 | 1/1958 | Greenwood | 137/536 |
| 3,072,143 | 1/1963 | Fleischhacker | 137/514 |
| 3,174,500 | 3/1965 | Johnson | 251/297 X |
| 3,409,037 | 11/1968 | Nelson | 137/529 X |
| 3,768,299 | 10/1973 | Garren | 73/4 R |
| 4,178,960 | 12/1979 | Napolitano | 137/529 |

FOREIGN PATENT DOCUMENTS

| | | | |
|---|---|---|---|
| 1051590 | 9/1957 | Fed. Rep. of Germany | 137/529 |
| 199541 | 6/1923 | United Kingdom | 137/467 |
| 808577 | 2/1959 | United Kingdom | 251/297 |
| 523230 | 8/1976 | U.S.S.R. | 137/529 |

Primary Examiner—Robert G. Nilson
Attorney, Agent, or Firm—Charles C. Garvey, Jr.

[57] ABSTRACT

The present invention provides a pressure relief valve having a broad range of variable relief pressures. The valve has an inlet passage, an outlet passage, a valve seat interposed between said passages, a valving member mounted for movement into and out of sealing engagement with the valve seat, a valve stem assembly operably connected to said valving member, and two or more resilient compression springs of preferably variable length mounted relative to said valve stem to exert a progressively greater compressive force upon said valve stem upon compression of said valve springs, and an adjustable pressure plate assembly for pre-compressing of the compression springs so as to set the relief pressure at a desired pressure value. A preferred embodiment is directed to that comprising a valve stem assembly for preventing the valve spring from being compressed beyond a predetermined selected point of relief pressure. Another preferred embodiment provides a sear assembly which eliminates the possibility of an initial pop-off chattering of the valving member relative to the valve seat. The sear cooperates with the valve base plate to hold the valving member in the sealed position over a pressure span. Once the sear is overcome, valve opening is full. The hysterisis error is thus a desireable value when inspecting a cycle of valve opening and closure.

6 Claims, 8 Drawing Figures

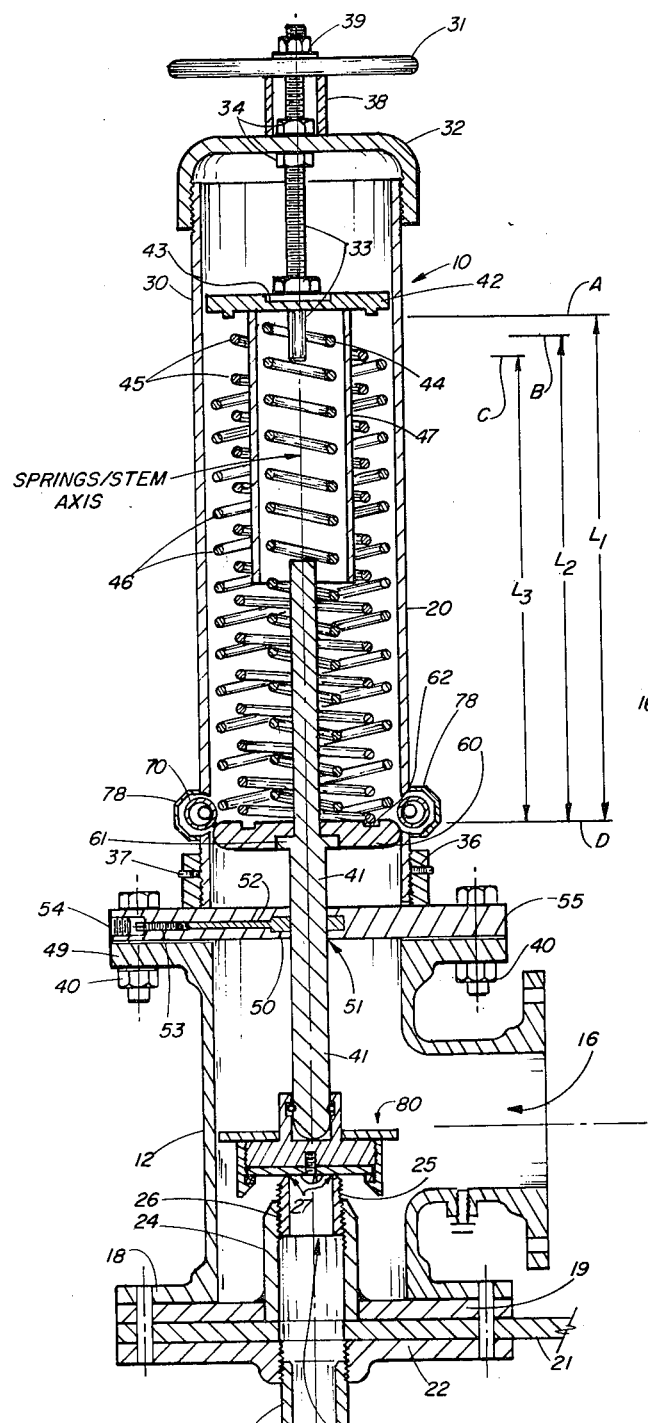
FIG. 1
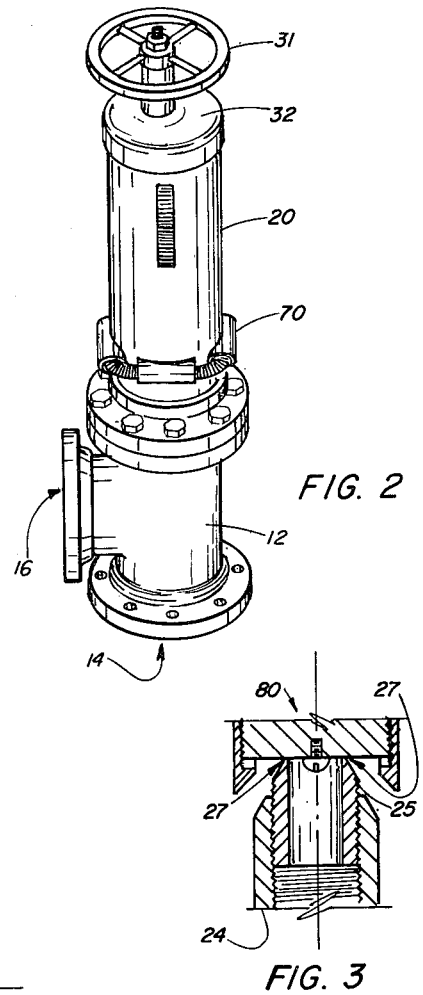
FIG. 2
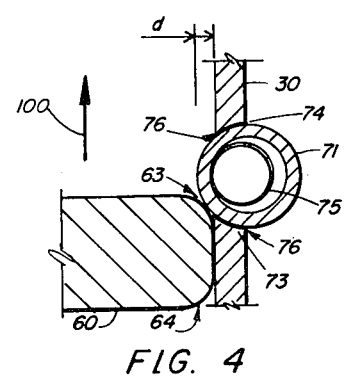
FIG. 3
FIG. 4

VARIABLE PRESSURE RELIEF AND CONTROL VALVE

REFERENCE TO RELATED APPLICATION

The present application is a continuation-in-part of U.S. Ser. No. 260,849 filed May 5, 1981, now abandoned, which is a continuation-in-part of abandoned U.S. Ser. No. 244,703 filed Mar. 17, 1981, which is a continuation-in-part of U.S. Ser. No. 145,478 filed May 1, 1980, now abandoned.

TECHNICAL FIELD

The present invention is concerned with pressure relief devices. More particularly, the present invention is especially directed to a pressure relief valve for gases including steam, and liquids which has an infinite or very broad range of relief pressure settings.

BACKGROUND ART

A fluid relief valve type of device in the hydraulic arts is defined as a control means for pressure relieving a particular closed system under pressure. The need for such devices are manyfold and well recognized in the arts. While the state of the art is well advanced, the various relief valve types of devices sold today have certain similar limitations. For one, relief valves as sold today are characterized as having a very limited range of pressure relief settings, and these generally can operate efficiently within a relatively narrow pressure range defined between their pressure pop-off settings and reseating pressures.

Another characteristic problem with present day relief valves is due to their generally complex internal design, that is, their working parts, which are prone to either mechanical failure and/or plugging, especially when subjected to a corrosive atmosphere. Merely constructing the internals of such valves of anti-corrosive materials will not necessarily solve the problem as valve failure is often caused by raw material or by-product plugging of the valve stem due to their complexity of design, especially those providing for fluid flow through its internal mechanism. The net result is that the system does not relieve itself and goes hydraulic whereby a line is ruptured and raw materials are spilled in the environment and/or wasted to the atmosphere. Or, the valve sticks open and raw materials are by-passed from the system and quite often wasted.

Another problem with prior art relief valves which have been designed for a range of different pressure settings is that quite often such valves can be shut off entirely by virtue of the variable pressure setting means built into such values. Because of its simplicity of design, it can be inexpensively manufactured for use in certain conventional operations which have been plagued with relief valve problems, quite often ignored on the basis of being economically unsolvable. With the advent of ecological concern for the environment as well as the need for avoiding waste of natural resources, the present valve mechanism finds particular application in such areas as fluid transporting operations, for example, pumping fluids between vessels at any pressure.

By way of specific example, in the pumping of fluids aboard vessels, ships, barges, etc., the U.S. Coast Guard regulations dictate that all fluid relief devices are to be set at a maximum of 125 psi., viz. the prescribed safe working pressure of conventional transfer hoses employed in such operations. For safety reasons, liquid transfer aboard barges is generally accomplished in the 50 psi or less range. Transfer hoses are hydraulically tested at 1½×maximum allowable pressure which normally equals about 187.5 psi. Such hoses are tested while positioned in a straight line, however, the strength of the hose is greatly reduced while in use where it becomes twisted, subjected to short radius bends, pinched, kinked, or similarly abused.

Many relief valves now in use aboard oil vessels are highly vulnerable to freezing by corrosion and once they become inoperative and should the flow be restricted due to human error with conventional line valves or other causes, the transfer hose becomes a relief valve. A burst oil transfer hose during operation can be economically and ecologically disasterous or cause an explosion or fire resulting in injury or death.

DISCLOSURE OF INVENTION

The present valve overcomes these and other problems aboard vessels and the like as well as other pressure relief applications and thereby greatly improves the safety of wharf operation as well as provides the many other advantages and features elaborated hereinafter.

The present invention provides a variable pressure relief valve for relieving pressures in a fluid line over a broad pressure span of, for example, 0 to 250 pounds psi. The present invention provides a valve body having an inlet passage on the valve body connectable to a fluid line to be valved. An outlet relief passage is provided on the valve body with a valve seat being placed within the valve body in between the inlet and outlet passages. A valving member is movably mounted within the valve body for movement into and out of sealing engagement with the valve seat to thus form a closure or an opening of the valve seat. A resilient actuator assembly is affixed to the valve body and urges the valving member into sealing engagement with the valve seat with a desired pre-setable relief pressure value. The resilient actuator comprises at least in part a first compression means which biases the valve into engagement with the seat over a low end pressure scan beginning at a negligible pressure value and a somewhat higher pressure relief value. A second compression means separate from the first biases the valving member toward engagement with the seat over a second pressure span beginning at an intermediate pressure relief value greater than the negligible pressure relief value and continually to a higher pressure relief value. The first compression means can cooperate with the second compression means for the biasing effect throughout the intermediate pressure relief span. In the preferred embodiment, the first and second compression members are independent coil springs with are concentrically placed within the actuator in a provided spring housing. Means is provided for adjustably varying the biasing force exerted by each of the first and second compression means which is in the preferred embodiment a hand wheel operated pressure plate which is linearly movable with respect to the coil springs, being able to compress the coil springs within the spring housing to increase force applied through a provided valve stem to the valving member increasing its closure over the valve seat and thus increasing pressure values which can be relieved. The resilient actuator provides a spring housing, a lower shaft affixed at one end to a valve seat which moves therewith, and a base plate placed within the spring housing and affixed to the stem with the valving member, stem, and base plate moving responsive to seating and unseating of the valving member on the valve seat. A plurality of concentrically placed coil springs are mounted within the spring housing and terminate at one end portion thereof at the base plate. The opposite end portion of the spring housing provides a movable pressure plate which can be linearly moved within the spring housing to compress or decompress the concentrically placed coil springs. Force applied by the concentrically placed coil springs to the base plate is transmitted through the valve stem directly to the valve seat thus varying the compressive force applied by the valving member against the valve seat. In this manner, a variation of pressure relief values can be achieved. In the preferred embodiment, the coil springs are of different lengths with three springs being preferably provided. The first spring during compression thereof provides a pressure relief span over a low pressure value range of settings. Continued compression of the first spring causes the second spring which is somewhat shorter to begin compression. Compression of the first and second springs then provides a pressure relief value span of intermediate range. Continued compression causes the second spring which is somewhat shorter to begin compression. Compression of the first and second spring then provides a pressure relief value span of intermediate range. Continued compression causes the third spring which somewhat shorter than the second spring to begin compression at which time all three springs are being compressed which produces a pressure relief span of higher pressure relief values.

An anti-chatter mechanism provides positive, full opening (equal to a desireable discharge area) in the form of the sear assembly and relieves excess pressures at a controllable minimum or desired maximum range of pressure drop for reseating. As an example, a two-inch valve would desireably lift the valving member disc, for example, one-quarter the diameter of the conduit being valved. The sear frictionally retains the valving member in its closed position until a desired pressure value is reached (which could be preset) after which, the sear resistance is overcome and the valve quickly and fully opens, resistance being minimal until full opening occurs. Likewise, the sear retains the valve open until complete pressure relief.

The valve of the present invention provides a construction which relieves velocity values greatly enhancing valve life. The actuator and valve body are isolated by a seal assembly which allows the valve actuator to function isolated from the products being relieved thus eliminating corrosion and mechanical erosion problems and attentive malfunctions. The valve of the present invention can be set at any of a desired variable pressure setting including a desired maximum pressure and can be sealed to prevent excess pressures yet affords optional lesser pressure relief values as desired with the seal intact. Authorized persons by breaking the seal could set the valve to relieve at any desired pressure. This procedure would be essentially desirable where hoses are part of the discharge medium as kinking of the hose or a short radius bend reduces the ability of the hose to withstand its design pressures and a lowered pressure relief value back to the suction could eliminate physical, environmental, hazard, and like damages as well as captivate the material being transferred.

With the present invention, the physical size of the valve would be smaller than a similar conventional pressure relieve valve which could relief pressures of the same pressure value and volume.

Reductions in velocity at the discharge would eliminate ear damage by reducing decibels to a desirable level when escaping gases might otherwise exceed the speed of sound.

The present invention provides a means for interchangeability of the valve seat area thus providing an overall valve apparatus of great versatility.

An object thus of the present invention is to provide a pressure relief valve which is operable over a wide span of pressure relief values beginning at a negligible pressure relief value and increasing to a desired maximum.

An object of the present invention is to provide a variable pressure relief valve capable of being set at precise pop-off relief pressures over a very broad range of operation.

Another object of the present invention is to provide a relief valve having desirable hysteresis error during a cycle of valve opening and closure.

Yet another object of the present invention is to provide a relief valve which can be very economically produced because of its simplicity of design.

Another object of the present invention is to provide a pressure relief valve having an internal mechanism which because of its simplicity of design is very operationally dependable.

Among the many advantages and features of the present invention, in addition and/or in complement of those discussed above, are that:

1. The opening area for exhaust of fluids through the present valve is proportionately much larger than for similar conventional relief valves of essentially the same pipe size;

2. The discharge pressure of a system in which the present valve is installed can be reduced to the demand pressure thereby avoiding rupture of hoses in the system which hose may encounter short radius bends, kinking, or pinching present in the hoses thereby lowering their working pressure and requiring a system which will relieve timely;

3. The present valve will release at a desired relief pressure and promptly close once the pressure is dropped to any desired level whereby excessive relief is avoided as well as wasted energy;

4. The present valve has a controllable range of pop-off settings as well as a controllable range of closing settings whereby it reseats with a predetermined desirable pressure drop;

5. The present valve is quiet in operation because of materials passing through the present valve because of its relatively larger seat construction;

6. There is less wear of the valve internals due to the slower velocity of materials passing through the present valve because of its relatively larger seat construction;

7. The present valve can effectively pass 100% of the system's fluid because of its relatively large internal dimension;

8. The valve can be set reasonably accurately by use of the indicator on the outer spring chamber without pressurizing the valve or the system;

9. Because of the 360° valve seat, minimal stem rise produces complete opening;

10. The range of operating pressures of the present valve as compared to a conventional valve of similar size is in the excess of 20 to 1 for a given size of the present valve, and additionally, the flow differential through the present valve as compared to a similar conventional size valve is, for example, approximately 4 to 1;

11. The present valve incorporates interchangeable valve seats whereby the same size valve is adaptable to many size lines.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a elevational sectional view of the preferred embodiment of the apparatus of the present invention;

FIG. 2 is a perspective view thereof;

FIG. 3 is a detailed fragmentary view of the valve seat and valving member portions of the preferred embodiment of the apparatus of the present invention;

FIG. 4 is a detailed fragmentary view of the sear portion of the preferred embodiment of the apparatus of the present invention;

BEST MODE FOR CARRYING OUT THE INVENTION

Figure 5:
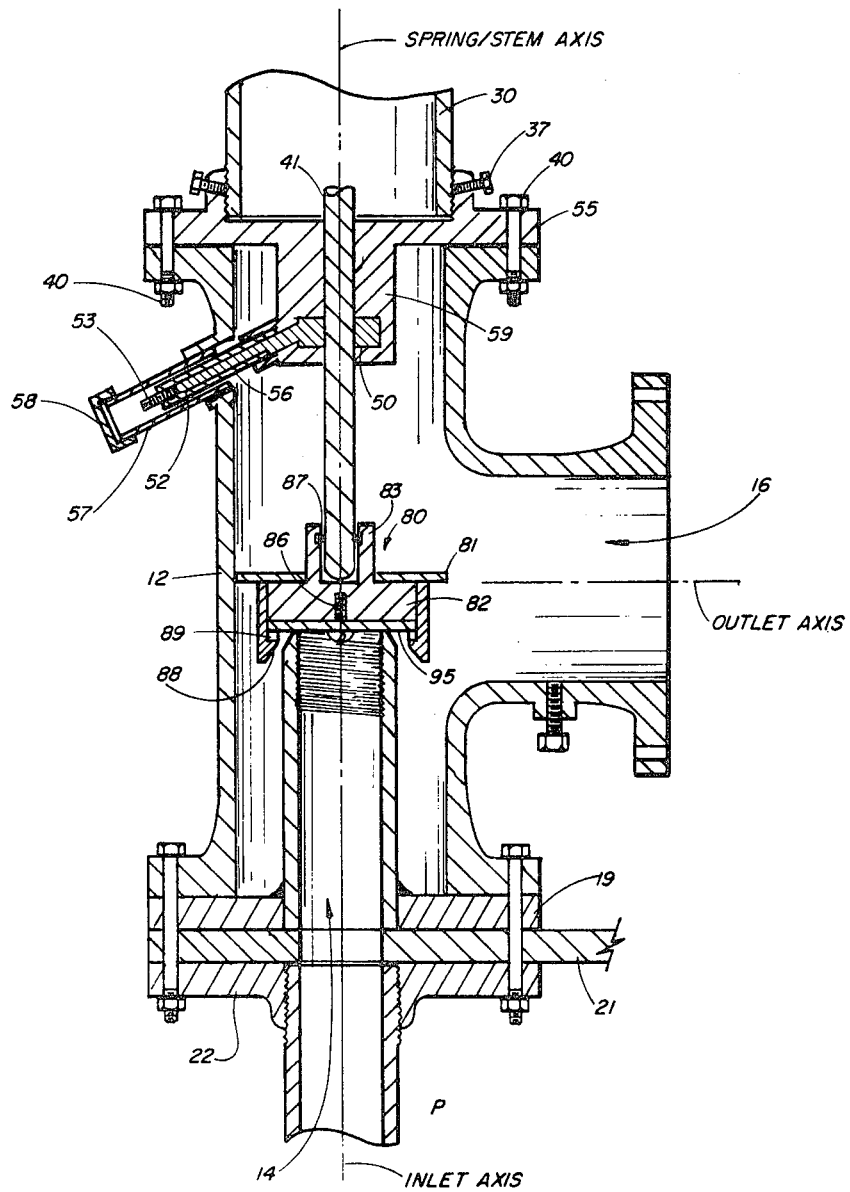
FIG. 5 is a partial sectional view of the preferred embodiment of the apparatus of the present invention illustrating the valve body portion thereof and an alternate construction of the valve stem seal mechanism.

Referring to FIG. 1 of the drawings, the variable pressure relief valve of the present invention designated generally by the numeral 10 comprises the main valve body portion assembly 12 and the valve actuator portion 20.

Valve body 12 provides inlet passage 14 portion which is operably connected to side discharge outlet 16. The inlet passage 14 is further provided with a flange 18 to which is affixed a seat assembly flange 19. Flanges 18, 19 are bolted together in a conventional fashion by a multitude of bolt and nuts (not shown).

Spectacle 21 and piping 22 flanges are also provided and are described more fully in my now abandoned U.S. patent applications, Ser. Nos. 06/145,478 244,703 and 260,849. Flange 22 is connected to piping P which would communicate with a desired fluid stream to be relieved.

The inlet passage 14 of the valve body 12 is bored to receive the valve seat flange 19 which in turn is provided with a threaded nipple 24 with a threaded insert portion 25. Pipe nipple 24 portion is provided with inner threads 26 into which insert 25 is threadably placed.

An inspection of FIG. 1 illustrates more particularly the construction of actuator 20. A cylindrical sleeve 30 is provided with threads at each end portion, for example, for forming a connection between sleeve 30 and valve cap 32 which can be, for example, threadably attached thereto.

At its opposite end portion, sleeve 30 would threadably attach to collar 36 which would likewise be threaded on its interior to accept sleeve 30. Socket 36 would be welded, for example, to flange 55 and the connection of sleeve 30 to socket 36 could be completed by the use of set screws 37. A hand wheel 31 would be provided for applying rotational energy to shaft 33 which would be threadably attached to nuts 34 which could be attached to cap 32. A spacer sleeve 38 would define the maximum amount of downward rotational movement of hand wheel 31 which would limit the amount of compression of springs 44-46 as will be described more fully hereinafter. An uppermost nut 39 would prevent a loosening or removal of hand wheel 31 from shaft 33. Shaft 33 would be threaded, for example, from its uppermost tip at nut 39 to its lowermost tip, leaving a certain unthreaded portion which would act as a stop to limit the degree of opening of valving member 80 responsive to its being forced upwardly by pressures being relieved at which time stem 41 would contact shaft 33.

Threadably attached at the lowermost end portion of shaft 33 would be pressure plate 42 which would apply compressive force to springs 44-46. Pressure plate 42 would be attached by using a thrust bearing, for example, and nut assembly 43 to shaft 33.

Stem 41 would provide at annular shoulder 61 a bottom plate 60 having an upper annular groove 62 which would engage at least one of springs 44-46. A spring housing would thus be defined between bottom plate 60 and pressure plate 42 and within the confines of sleeve 30. Support against lateral deformation of each spring 44-46 would be provided in the form of outer sleeve 30, innermost sleeve 47 which would be attached to and travel with pressure plate 42, and stem 41.

Springs 44-46 would preferably be of varying length with innermost spring 44 being of a length L1, middle spring 45 being of a length L2 and outermost spring 46 being of a length L3.

The use of varying springs provides a means for applying varying compressive force to bottom plate 60 and thus through shoulder 61 to stem 41 and thus to valving member 80. The use of multiple springs of differing lengths provides in combination with the apparatus as described a relief valve which can relieve pressures over a very broad span of pressure values of, for example, 0 to 250 psi or the like. Compression of inner spring 44 of a distance L1 minus L2 would provide the minimal compression to valving member 80 over a lowermost span of compression values. During compression over distance L1 minus L2 from position A to position B, spring 44 would provide, for example, substantially all of the compressive force applied to valving member 80. Inner spring 44 and intermediate 45 would combine to provide compressive force to valving member 80 urging it into a closure of seat 27 when pressure plate 42 were moved a distance beginning at position B and proceeding a distance L3 minus L2. During this period of intermediate compression, an intermediate span of pressure relief values would be applied to valving member 80 as pressure plate 42 would move from position B to position C. During this intermediate pressure value span, compressive force would be applied to valving member 80 principally by inner spring 44 in combination with intermediate spring 45. Beginning at position C, and continuing downward until maximum compression of a desired value was achieved, compression would be by a combination of springs 44, 45, and 46. This would provide compression over the higher of three pressure spans.

For example, compression of plate 42 from position A to position B might produce compression values of 0 to 50 pounds psi.

An intermediate pressure span of, for example, 50 to 100 pounds psi might be achieved by compressing plate from position B to position C while pressures in excess of 150 pounds to, for example, 250 pounds might be achieved by compressing plate 42 toward base plate 60 exceeding position C in a direction toward the uppermost surface of base plate 60 which is indicated in the drawings as position D.

From the above, one skilled in the art would see that a broad range of compression values could be achieved for operating the pressure relief valve of the present invention in a variety of environments, in a variety of applications, and in a variety of pressure installations.

Stem 41 would be attached at its lowermost end portion to valving member 80. A flange 55 attached by welding, for example, to collar 36 which would also be attached by welding, for example, to flange 49 which were attached to valve body 12. Bolted connections 40 could be provided as desired. A sealing of stem 41 in order to isolate valve body 12 from actuator 20 would be achieved using an annular packing gland 50 which would be provided about an opening 51 in flange 55. Opening 55 would be of a diameter to allow stem 41 to pass therethrough with minimum tolerances. A packing conduit 52 would communicate with annular packing gland 50 with compression being applied by threaded shaft 53 mounted threadably within conduit 52. Conduit 52 would be provided, for example, with a length of female threads on its inner bore with rotation of threaded shaft 53 forcing packing material into packing gland 50 and about stem 41. A closure plug 54 would seal off conduit 52 between periods of access to shaft 53.

FIG. 3 illustrates valving member 80 as it forms a seal on valve seat 27. Valve seat 27 would be provided on the uppermost surface of valve seat element 25 which would be a removable replaceable insert provided upon pipe nipple 24. Both insert 25 and nipple 24 would be provided with cooperating threads which would allow for a threadable engagement of element 25 into nipple 24.

Nipple 24 would be welded, for example, to flange 19 which would be bolted to a companion flange 18 mounted upon body 12. From the above, it can be seen that various valve seat inserts of varying diameters and sizes could be easily and quickly interchanged in order to provide a relief valve of various sizes with very minimal replacement. In this manner, one skilled in the art will see that the valve seat could be quickly and easily replaced if in need of replacement, and if in need of various pressure relief orifice values.

A spectacle flange 21 would be attached to flange 19 while lowermost flange 22 would connect with a piping system P which would produce the source of pressurized fluid to be relieved.

Figure 8:
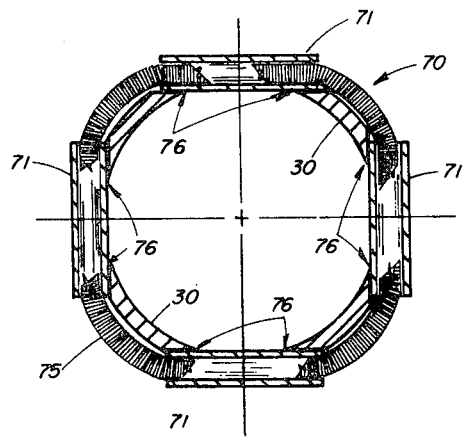
FIG. 8 is a top view of the sear portion of the preferred embodiment of the apparatus of the present invention.

A sear assembly 70 is shown in FIG. 1 with an outer annular protective housing 78 thereabout. Sear assembly 70 is also seen more particularly in FIGS. 4 and 8 as providing a plurality of elongated cylindrical sears 71, each cooperating with a provided slot 76 formed in sleeve 30 between edges 73 and 74. Note from an inspection of FIG. 4 that each sear member 71 would be of a diameter slightly greater than the diameter of slot 76, thus only allowing sear 71 to protrude inwardly a distance d which would be sufficient to retain bottom plate 60 and prevent its upward movement as shown by arrow 100 in FIG. 4 until the compressive forces of spring 75 were overcome by a desired pressure value as would be preset. Edges 63, 64 of plate 60 could be rounded if desired. FIG. 8 illustrates more particularly sear assembly 70, showing continuous coil springs 75 and four, for example, sear elements 71 and each cooperating with a provided slot 76 formed in sleeve 30. The compressive force provided by coil springs 75 would bias each sear element 71 inwardly into a position where each sear element 71 would protrude in holding bottom plate 60 in a downward position disallowing its upward movement until a desired pressure value were generated within valve body 12 at which time the sear force 71 would be overcome and bottom plate 60 would move upwardly allowing stem 41 and valving member 80 to likewise move upwardly in a rapid fashion in the direction shown by arrow 100 in FIG. 4. This "pop-off" arrangement would allow quick and full opening of valving member 80 from seat 27 as desired which would permit a complete and full relief of the pressure be relieved.

Figure 6:
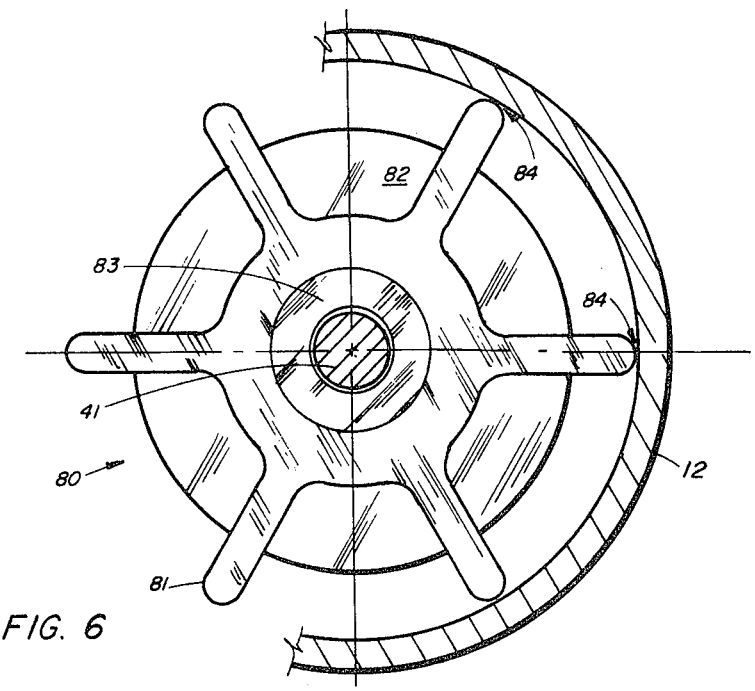
FIG. 6 is a partial top view of the preferred embodiment of the apparatus of the present invention illustrating the valving member.
Figure 7:
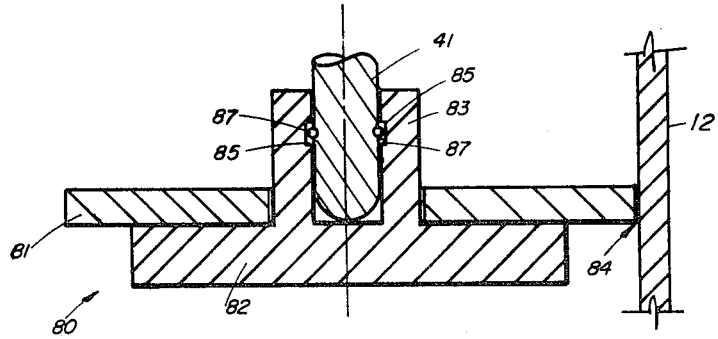
FIG. 7 is a sectional view of the valving member portion of the preferred embodiment of the apparatus of the present invention.

FIGS. 6 and 7 best illustrate valving member 80 which would provide a valve disk 82 integrally formed with collar 83. An annular groove 85 formed in collar 83 would be occupied by an annular spring element 87. The bottommost portion of stem 41 would be rounded and the connection of collar 83 thereto would be somewhat loose allowing a slight articulation of collar 83 and disk 82 with respect to stem 41 which would provide for a true and complete closure of valve seat 27 by valving member 80. A means for preventing lateral displacement of stem 41 and valving member 80 would be provided by spider 81 which would begin at collar 83 and proceed outwardly to edge 84 where it would terminate slighty short of the interior wall of value body 12 as seen in FIGS. 6 and 7. Lower depending skirt 88 provides an inward bevel with annular spring 89 retaining valve seat wear disk (asbestos, for example) 95 being retained in position by spring 89 and bolt 86.

In FIG. 5, an alternate sealing assembly for stem 41 provides shaft 53 mounted within conduit 56. An outer housing 57 and cap 58 form a protective cover. Conduit 56 communicates with flange 55 which has a downwardly depending packing section 59 occupied by packing gland 50. Valve 10 could be manufactured of any suitable valve material such as steel, stainless steel, cast iron, bronze or the like.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A variable pressure relief valve for relieving pressures in a fluid line comprising:
    a. a valve body;
    b. an inlet passage on said valve body connectable to a fluid line to be valved;
    c. a relief passage on said valve body;
    d. a valve seat interposed between said inlet and said outlet passages at generally the intersection of the inlet passage axis and the outlet passage axis;

e. a varying member movably mounted within said valve body for movement into and out of sealing engagement with said valve seat;

f. a valve stem attached at one end portion to said valving member and extending therefrom externally of said valve body;

g. a valve actuator housing bonnet attached to said valve body on generally the same axis as said valve inlet, said stem extending into said actuator housing a distance;

h. a connecting flange member means placed laterally across said valve actuator housing for forming a connection between said valve body and said actuator housing bonnet, said flange member means providing an opening through which said valve stem protrudes from said valve body into said actuator housing bonnet;

i. a base plate member attached to said valve stem and moving therewith responsive to opening and closing of said valving member upon said valve seat;

j. a plurality of coil springs having at their central axis said valve stem and registering at one end portion with said base plate member, said coil springs extending longitudinally into said actuator housing bonnet different linear distances;

k. a pressure plate movably mounted within said valve housing generally opposite said base plate, with said coil springs being placed within said housing bonnet generally between said base plate and said pressure plate;

l. a threaded shaft placed through said housing bonnet opposite said base plate and attaching at one end portion to said pressure plate, rotation of said shaft affecting a linear movement of said pressure plate with respect to both said housing bonnet and said base plate to variably compress or decompress said springs therebetween;

m. means for imparting rotational energy to said shaft; and n. sear means independent of said coil springs and carried by said housing bonnet for imparting a frictional retention to said base plate member at least prior to opening and prior to closing of said seat by said valving member.

2. The invention of claim 1 wherein said sear means comprises:

a plurality of elongated cylindrical sears each cooperating with a slot formed in said housing bonnet, the diameter of said cylindrical sears being slightly greater than the diameter of said slot allowing a portion of said cylindrical sear to protrude inwardly of said housing bonnet for retaining said base plate member.

3. The invention of claim 2 further including:

coil spring means providing said sears with compressive force for biasing each sear to protrude inwardly of said housing bonnet.

4. An anti-chattering pressure relief valve to provide positive valve opening and closing of the type which includes a main body having a valve seat and valving member, and a bonnet housing a valve stem and spring means extending between a pressure plate and a bottom plate member operably positioned within the housing bonnet and attached to the valve stem for seating the valving member upon the seat, the invention comprising:

sear means independent of the spring means and carried by the housing bonnet for imparting a frictional retention to the base plate member at least prior to opening and prior to closing of the seat by the valving member.

5. The invention of claim 4 wherein said sear means comprises:

a plurality of elongated cylindrical sears each cooperating with a slot formed in the housing bonnet, the diameter of said cylindrical sears being slightly greater than the diameter of said slot allowing a portion of said cylindrical sear to protrude inwardly of said housing bonnet for retaining said bottom plate member.

6. The invention of claim 5 further including:

coil spring means providing said sears with compressive force for biasing each sear to protrude inwardly of said housing bonnet.

* * * * *